United States Patent [19]
Waybright

[11] Patent Number: 5,483,921
[45] Date of Patent: Jan. 16, 1996

[54] METHOD OF AND SYSTEM FOR MILKING MANY ANIMALS

[76] Inventor: Bert J. Waybright, 1865 Mason Dixon Rd., Gettysburg, Pa. 17325

[21] Appl. No.: 201,512

[22] Filed: Feb. 24, 1994

[51] Int. Cl.⁶ .................................. A01J 5/00; B60P 3/04
[52] U.S. Cl. .................................. 119/14.02; 119/14.04; 119/11
[58] Field of Search ............................. 119/10, 11, 14.02, 119/14.03, 14.04, 843

[56] References Cited

U.S. PATENT DOCUMENTS

| | | | |
|---|---|---|---|
| 455,130 | 6/1891 | Stewart | 119/10 |
| 3,699,923 | 10/1972 | Strom | 119/14.04 |
| 3,810,442 | 5/1974 | Jacobs et al. | 119/14.03 |
| 3,824,958 | 7/1974 | Parady, Jr. | 119/10 |
| 4,261,292 | 4/1981 | Le Du | 119/14.04 |
| 4,323,033 | 4/1982 | Vosyka et al. | 119/14.04 |
| 4,977,856 | 12/1990 | Norwood | 119/14.03 |

FOREIGN PATENT DOCUMENTS

| | | | |
|---|---|---|---|
| 762813 | 9/1980 | U.S.S.R. | 119/14.04 |
| 1690621 | 11/1991 | U.S.S.R. | 119/14.04 |

*Primary Examiner*—Robert P. Swiatek
*Attorney, Agent, or Firm*—Lowe, Price, LeBlanc & Becker

[57] ABSTRACT

Many cows are simultaneously loaded onto a stationary car that is thereafter moved to a milking station. The time for the car to move from a loading station to the milking station exceeds the time while the car is at the milking station. The distance between the loading and milking stations exceeds the length of each of several such cars that traverse a path between the stations. The cars move from the milking station to an animal discharging station and then back to the loading station. Teats are cleaned and dried at stations between the loading and milking stations. Each car is broadside of the path at the loading and discharging stations so the cows have equal access to and from stalls of cars at the loading and discharging stations. Each car includes an excrement catcher that is raised as the cows enter the stalls. Two such paths share an operator at a loading area and another operator at two side-by-side milking areas.

37 Claims, 9 Drawing Sheets

METHOD OF AND SYSTEM FOR MILKING MANY ANIMALS

FIELD OF INVENTION

The present invention relates generally to automated milking methods and systems and more particularly to a method of and system for large scale milking of domestic animals, wherein the animals are loaded onto a car that is moved from a loading station to a milking station, thence to a discharging station and the time for moving the car from the loading station exit to the milking station entrance exceeds the time while the car is at the milking station. Another aspect of the invention relates to an elongated car particularly adapted to be used in such a method and system wherein the car includes stalls arranged so the animals can enter them head first via a path where an excrement-catching means is normally located and wherein the excrement-catching means is moved out of the path as the animals are loaded onto the car.

BACKGROUND ART

At large modern dairy farms, 600 to 2,000 cows are typically milked three times a day. The teats of each cow must be disinfected and dried prior to the cow being milked. Because of the labor intensive nature of these operations and the cost of labor, many large modern dairy farms include automatic devices for performing these operations.

Some large modern dairy farms clean, dry and milk cows located on an intermittently driven turntable with numerous stalls. The turntable is driven between adjacent stationary positions or stations. At a first station, the cows are loaded, one by one, onto the turntable stalls so one cow is in each stall. The turntable then is turned so the cow is moved to a second station, where the udders and teats of each cow are sprayed with water for cleaning. The turntable is then moved so the cow advances to a third station where the teats dry or are dried. From the third station, the cow is moved on the turntable to a fourth station where milking cups are applied to the cow teats, the cow is milked and the milk is pumped to a processing location. After the cow has been milked and while the cow remains at the fourth station, the milking cups are automatically removed from the cow teats and disinfectant is sprayed on the teats. The turntable is then turned so the cow is at a fifth station where it is discharged from the turntable. The turntable then returns to the first station where another cow is loaded onto the now-vacant stall. Usually the turntable is intermittently moved between the various stations so the cow is stationary at each station. This prior art system is advantageous because it requires a minimum amount of personnel to load and discharge the cows from the turntable.

A disadvantage in this turntable arrangement, however, is that the cows are loaded single file into the turntable stalls and some cows are reticent to get on the turntable. If one cow is reluctant to get on the turntable, the entire process is slowed because of the single file first in, first out nature of the turntable operation. The process also is quite time consuming because nothing happens to the vast majority of cows to be processed while a few cows are on the turntable.

I am also aware of other prior art as disclosed in Vosyka et al., U.S. Pat. No. 4,323,033, LeDu, U.S. Pat. No. 4,261,292 and Jacobs et al., U.S. Pat. No. 3,810,442. The apparatus and method described in all of these patents have certain disadvantages which, as far as I know, have prevented their large scale adoption and commercialization. In the Vosyka et al. system, the animals (cows) are continuously moved in a covered installation from one region to another region. The cows thus stay on the platforms and are not permitted to graze or even to move significantly. It has been found that cows subjected to such confined situations do not produce nearly as much milk as cows which graze and move about freely. Another apparent disadvantage of the Vosyka et al. arrangement is that there is no provision to wash and/or dry the teats and udders of the cows.

In the LeDu system, the animals (ewes) are loaded onto individual platforms, each including plural stalls, so one ewe is located in each stall. Two such platforms are provided and arranged so they move longitudinally on parallel tracks past a milking station occupied by an operator who applies milking cups to teats of the animals. The animals are loaded into the stalls on the platform at a position immediately next to the operator's position. The platform is driven so the animal is moved from the loading area to the cup applying area immediately after the animal has been loaded onto the car. The operator stays in the same place relative to parallel tracks for the platforms as stalls on the platform are moved in front of him in sequence. The operator turns 180° to service the animals on both platforms. After the milking cups have been applied to all of the animals on a particular platform, movement of the platform stops and the milking operation of all of the animals on the platform is completed.

If difficulty is encountered in getting one animal to move from the loading area onto the platform in the LeDu system, the operator is idle and operation efficiency is decreased. The inability to get one animal from the loading area onto the platform essentially stops the production line. This inefficiency is manifested many times in a large production facility, handling 600 to 1,400 animals three times a day.

Jacobs et al. discloses a milking parlor including two parallel platforms, each of which is moved from a first area to a second area and back to the first area. At the first area, cows are loaded, single file, onto the platforms and their teats are sprayed, but not dried. After all of the cows have been loaded onto the platform at the first area, the platform is moved to the second area, where milking cups are applied to the teats of the cows and the cows are milked. After milking, the platform returns to the first area via the same path it took in going from the first to the second area. At the first area the cows are discharged from the platform and another set of cows is then loaded onto the platform. While the cows on the first platform are being milked, cows are being removed from the second platform, after which another set of cows is loaded onto the second platform. After the cows on the first platform have been milked, the cows on the second platform are moved into a second milking areas close to and opposite from where the cows on the first platform were milked.

A problem with the Jacobs et al. arrangement is that there is a considerable amount of wasted time. Nothing happens at the loading/unloading area associated with the first platform while the cows on the first platform are being milked. Similarly, nothing happens in the milking area associated with the first platform while the cows are being loaded and discharged from the first platform. Hence, the equipment at the loading and unloading area and at the milking area associated with each platform is idle for more than one-half of the time during the milking operation. This is an inefficient use of the capital investment associated with the equipment at the loading and unloading area, as well as at the milking area. The Jacobs et al. system is also inefficient because the animals are loaded single file onto the platforms. If one cow is reluctant to get on the platform the entire operation is slowed materially.

It is, accordingly, an object of the present invention to provide a new and improved method of and apparatus for efficiently milking a large number of animals.

Another object of the invention is to provide a new and improved method of and apparatus for milking a large number of animals simultaneously, through the efficient use of labor and equipment.

An additional object of the invention is to provide a new and improved method of and apparatus for efficiently milking a large number of animals wherein multiple animals are loaded onto a car at a first location and are transported to a second location where animals on the platform are milked and difficulties associated with loading an animal onto the platform do not adversely affect the time required for the milking operation.

A further object of the invention is to provide a new and improved efficient method of and apparatus for milking a large number of animals that are loaded onto a car at a first location, transported to a second location where the animals are simultaneously milked and the milking equipment is used for substantially more than half of the time while the apparatus is in use.

An added object of the invention is to provide a new and improved method of and apparatus for milking a large number of animals on a pair of production lines, wherein only one person is required at adjacent milking stations of the two lines and a single person is required at loading and discharge areas for the two lines.

Yet a further object of the invention is to provide a new and improved method and apparatus for milking a large number of cows wherein the cows are maintained in relatively closely confined quarters and udders and teats of the animals are cleaned with a relatively small amount of water.

Still another object of the invention is to provide a new and improved method of and apparatus for milking more than 160 cows an hour with only two people manning the milking facility, and provisions are provided for automatically washing and accomplishing drying of udders and teats of the cows.

DISCLOSURE OF THE INVENTION

In accordance with the present invention, the foregoing objects are attained by a method of milking at least several domestic animals on a large scale basis by loading at least several of the animals on a car while the car is at an animal loading station. After the car is moved with the animals thereon to a milking station, the animals are milked while the car is at the milking station. The time required for the car to traverse the distance from the loading station exit to the milking station entrance exceeds the time while the car is at the milking station. The car with the animals thereon is then moved from the milking station to an animal discharging station where the animals are discharged from the car. Because the time required for the car to traverse the distance from the loading station exit to the milking station entrance exceeds the time while the car is at the milking station, the reluctance of one animal in getting on the car does not slow the milking process.

A cleaning agent is preferably applied to teats of the animals while the animals are on the car and the car is between the loading and milking stations. The teats are dried or are permitted to dry before the car arrives at the milking station.

To facilitate and simplify handling, the car is stationary at each of the loading, cleaning, milking and discharging stations and no motors or other active elements are located on the cars. Instead all drive and other active mechanisms are provided at the stationary stations.

The car is preferably positioned so it is broadside of a path it traverses while at the loading and discharging stations so there is simultaneous equal access to at least several of the animals from a loading area into stalls of the car while the car is at the loading station and there is simultaneous equal access for the animals in the car from the stalls of the car into a discharge area while the car is at the discharging station. Preferably a plurality of the cars are provided and the aforementioned steps are cyclically repeated.

In a preferred embodiment, two of the loading, discharging and milking stations are provided, and the aforementioned steps are performed at the two loading, discharging and milking stations on animals in different cars. The two loading stations are located adjacent each other at a first region, enabling a single operator to load the animals from the first region into cars at the two adjacent loading regions. The two milking stations are located adjacent each other at a second region, enabling a single operator to apply milking cups to teats of the animals in a first car at one of the milking stations during a first interval and then applying milking cups to teats of the animals in another car at the other of the milking stations during a second interval.

The loading, discharging and milking stations are preferably in first and second paths along which the cars move. Each of the paths includes first and second parallel elongated segments. The cars are moved from the loading station to the milking station along the first segment of the path. After the milking step has been performed on the animals in a particular car, that car is transferred transversely of the two path segments from the first path segment to the second path segment. Then, the particular car is moved along the second path segment to the discharging station. After the animals have been discharged from the particular car in the second path segment, the particular car is transferred transversely of the two path segments from the second path segment back to the beginning of the first path segment where the animals are loaded onto the cars.

The above and still further objects, features and advantages of the present invention will become apparent upon consideration of the following detailed description of a specific embodiment thereof, especially when taken in conjunction with the accompanying drawings.

DESCRIPTION OF THE PREFERRED EMBODIMENT

Figure 1:
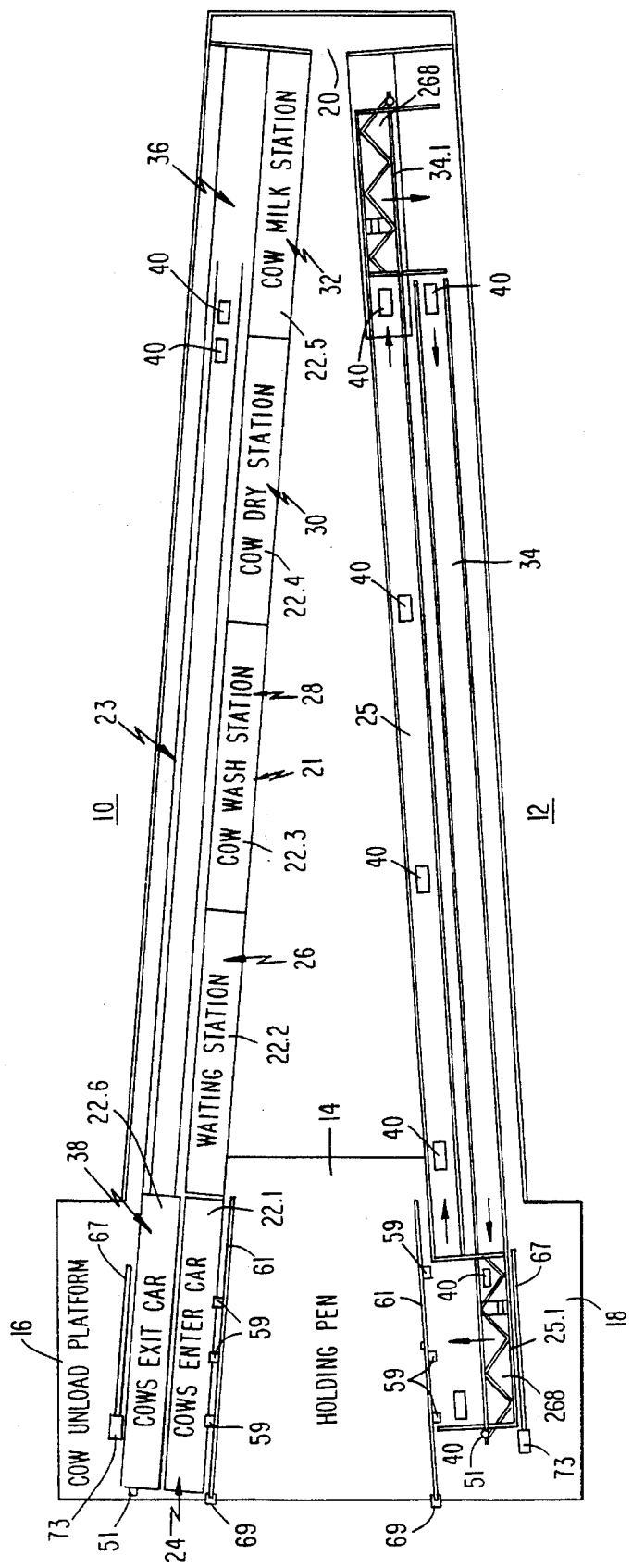
FIG. 1 is an overall drawing of the layout of a milking parlor system in accordance with a preferred embodiment of the present invention.

Reference is now made to FIG. 1 of the drawing, wherein the milking parlor system of the present invention is illustrated as including elongated paths 10 and 12, generally arranged to define legs of a triangle having a relatively small angle at its vertex. In the vicinity of the ends of paths 10 and 12 opposite from the vertex of the triangle are holding or loading pen 14, as well as discharge platforms 16 and 18. Pen 14 is between the ends of paths 10 and 12 so cows can walk head first with the assistance of a single operator onto cars 22 of both paths 10 and 12. Platforms 16 and 18 are on the outer portions at the ends of paths 10 and 12. After the cows on cars 22 have been milked they are prodded to walk head first off of the cars after the cars reach the platforms. Operator pit 20 is located at the portions of paths of lines 10 and 12 proximate the vertex of the triangle and farthest from pen 14. A single operator working in pit 20 puts milking cups on teats of the cows on the cars in paths 10 and 12. The milking cups are automatically discharged from the teats, in a well known manner, after each cow has been milked.

Each of paths 10 and 12 preferably includes five or six elongated identical cars 22 but any suitable number of cars can be in each path. Each of cars 22 preferably includes 24 parallel stalls, each having a longitudinal axis at right angles to the elongation direction of the car. Since paths 10 and 12 and the cars thereon are identical, the remaining description is generally confined to path 10 and the cars thereon.

Path 10 includes two elongated parallel segments, forward segment 21 and return segment 23, each including elongated tracks similar to railroad tracks. Forward segment 21 includes loading station 24, waiting station 26, cow washing station 28, cow drying station 30 and cow milking station 32, each having a length slightly greater than the length of each of cars 22. Milking station 32 is immediately adjacent operator pit 20. At opposite ends of return segment 23 are transfer station 36 and exit station 38, respectively opposite milking station 32 and loading station 24.

A car transfer mechanism is provided at the opposite ends of segments 21 and 23 to enable the cars to be moved from the forward segment to the return segment and from the return segment to the forward segment after the cows on a particular car have been respectively milked and discharged. To this end, fixed tracks 25 of segment 21 extend from the entry end of waiting station 26, adjacent the exit end of loading station 24, to the exit end of drying station 30, adjacent the entry end of milking station 32, while fixed tracks 34 extend along a corresponding portion of segment 23, from a region adjacent the exit end of return station 36 to a region adjacent the entry end of discharging station 38. At opposite ends of segments 21 and 23 are tracks 25.1 and 34.1 that extend in the same direction as path 10 and are moved by transfer tucks at right angles to the direction of the path.

Cars 22 sequentially move from stationary positions at loading station 24, thence in sequence to waiting station 26, wash station 28, drying station 30 and milking station 32. In one preferred embodiment, each car 22 stays at each of stations 26, 28 and 30 for approximately 12 minutes. Each car 22 stays at stations 24, 32 and 36 for an interval sufficient to enable the operations at these stations to be performed and is moved from the particular station when the next adjacent station becomes empty. In FIG. 1, cars 22.1, 22.2, 22.3, 22.4, 22.5 and 22.6 are illustratively shown as initially being at stations 24, 26, 28, 30, 32 and 38, respectively.

After cows on a particular car 22 have been milked at milking station 32, that car is driven transversely to the elongated direction of path segment 21 to return path segment 23. The cars 22 thus move from milking station 32 to transfer station 36, thence along return track 34 to discharge or exit station 38. After the cows have been discharged from a particular car at discharging station 36 that car is moved transversely of path segment 23 to loading station 24. While a particular car 22 is stationary at station 24, cows are loaded from holding pen 14 head first into that car. After cows have been loaded into all of the stalls in a particular car 22, that car is moved to waiting station 26, presuming the waiting station is empty. The particular car 22 stays at waiting station 26 until wash station 28 is empty, at which time the car is moved to the wash station. After the teats of the cows in the particular car have been washed at station 28, that car is moved to drying station 30, provided the drying station is empty. The particular car is moved from the drying station 30 to milking station 32 when the milking station is empty. Movement of cars from station 26 to station 28, and from station 28 to station 30 is automatic by providing a sensor for the presence of a car at stations 28 and 30 for activating drive mechanisms at stations 26 and 28, respectively.

At washing station 28 the udder area of the cows is sprayed with water having relatively high pressure using sprayers (not shown) mounted permanently at this station. The water flows through openings in the platform of each car 22. Alternatively sprayers are mounted on a platform or deck of each car 22 and the water is supplied by a central connection (not shown) to the car. The water is preferably applied in timed cycles so the teats are initially soaked and then washed. Such a design for washing station 28 greatly reduces the amount of consumed water because the cow is retained in situ at a known fixed position for the udder, the area to which the water is confined. Traditionally, cows standing in random fashion in a holding pen are cleaned by spraying large quantities of water everywhere in the pen to assure that at least some water gets on the udder; alternatively in the prior art the cows are washed by hand in the milking area, a labor intensive operation that slows the milking process.

At drying station 30, udders of the cows drip dry. Alternatively station 30 includes a blower for each stall of car 22 to ensure the drying process. The decision to provide blowers or to permit drip drying is determined by climate and speed of the operator in pit 20.

At milking station 32, the operator standing in pit area 20 attaches milking cups to teats of each cow, while checking for udder cleanliness and infection. The milking operator manages the milking process by alternating between the cows on cars 22 in paths 10 and 12, in a manner similar to the way it is done in a traditional milking parlor. However, efficiency as measured in cows-per-manhour increases greatly with the present invention over the prior art because cows in cars 22 simultaneously come to milking station 32 clean, dry and ready to have the milking cups put on them. After the cups have been applied, the 24 cows in car 22 are milked by a conventional automatic milker. This milking operation is to be contrasted with the typical single file method which invariably requires some operator prodding. After determining that all of the cows on a particular car 22 have been milked, a spray of disinfectant is applied automatically or under operator control to teats of the cows. The disinfectant is usually applied in the same manner that water is applied at station 28. Then the car is automatically transferred to transfer station 36 and the next car 22 advances to milk station 32 from drying station 30.

The car 22 at transfer station 36 is moved by a drive mechanism along return path segment 23 to discharging station 38 or may stack up on the return path segment 23, as needed, to wait until the loading operator is ready for the next car. At discharging station 38, the cows walk off of car 22 head first after a cow retaining head rail on the car has been rotated out of the path of the cows. The head rail is rotated after raising of cow restraining gate 67, having a length slightly greater than the length of each car 22. Gate 67 extends along the joint boundary of unloading platform 16 and discharging station 38, slightly outside the edge of car 22. The cows then step onto unloading platform 16 and wander back to a barn or pasture. Gate 67 is raised automatically by motor 73, fixedly mounted on side wall 53 at the end of station 38 where return path segment 23 ends. Motor 73 is activated by a sensor (not shown) for detecting the stationary presence of car 22 at station 38, immediately after arrival of the car via track 34.

After gate 67 has been raised, a latch mechanism for the head rail is released and the head rail is turned 360° by activating motor 51 fixedly mounted on wall 53. Motor 51 is automatically activated by a sensor detecting that gate 67 has been raised. Motor 51 has a hollow rectangular shaft that mates with a corresponding part of a drive mechanism for the head rail upon arrival of the car at station 38. When the operator determines that all cows have left the car 22 at station 38 and that station 24 is empty, he activates a switch to lower gate 67, move the car slightly away from the hollow shaft of motor 51, and then transfer the car to loading station 24.

When the empty car 22 arrives at station 24, cow retaining gate 61 is down. Gate 61 has a length slightly greater than the length of each of cars 22 and is located at the boundary between holding pen 14 and station 24, slightly beyond the edge of car 22. Immediately after the car 22 arrives at station 24 and becomes stationary, a detector activates motor 69, fixedly mounted on side wall 53, to automatically drive gate 61 upwardly. Gate 61 includes fingers 59 for engaging an excrement-catching back splash that extends along the back edge of each car 22. As gate 61 goes up, the back splash is driven up by fingers 59, enabling the cows to walk head first into stalls of the car 22 at station 24. After the operator has determined that all of the stalls on the car are appropriately loaded, he closes a switch to activate motor 69 to drive gate 61 down. As gate 61 descends, fingers 59 are lowered and the back splash descends by gravity into position below excrement discharge organs of the cows. After gate 61 is down, the cycle is restarted.

Because the interval from when a car 22 leaves loading station 24 to when it enters milking station 32 is considerably in excess of the time a car spends at milking station 32, the reluctance of a particular cow in walking from holding pen 14 to a particular car at loading station 24 does not slow the application of milking cups to teats of the cows by the operator at milking pit 20 and does not affect milking time or efficiency. In addition, operations involving unloading cows at station 36 and transferring empty cars from station 36 to station 24 do not slow the milking time. Because the path from the exit of station 24 to the entrance of station 32 is in excess of the length of each car 22 and usually two cars are between stations 24 and 32 there is no delay in moving the cars from station 24 or into station 32.

The cows traversing path 10 are driven from station to station by stationary intermittently activated motor assemblies 40 at each of stations 24, 26, 28, 30, 32, 36 and 38. A stationary motor assembly 40 is also associated with return tracks 34 of path 10. Transfer trucks at the ends of path segments 21 and 23 are provided with wheels that are driven by motors on the trucks. The wheels ride on rails that extend transversely to path segments 21 and 23.

Reference is now made to FIGS. 2–6 of the drawing wherein car 22 is illustrated as including elongated platform 42 on which are mounted divider loops 44 defining boundaries for 24 different stalls 46 having longitudinal axes extending at right angles to the elongated direction of platform 42. Beyond the stalls 46 at the ends of car 22 are inverted V shaped support frames 48 including beams 48.1 and 48.2.

Hollow shaft, i.e., pipe, 50, at the top of stalls 46, extends horizontally between and is supported by support frames 48. Head rails 52, one of which is provided on each side of each stall 46, are fixedly mounted on shaft 50. In normal position each of head rails 52 extends downwardly to engage the front of the cow's shoulder. Hence, head rails 52 normally prevent the cows from walking off the front end of the stalls, i.e. the ends of the stalls where the heads of the cows are located while the cows are in place. Shortly after car 22 arrives at station 36 head rails 52 are turned clockwise from the normal position thereof, as illustrated in FIGS. 3–6 by full lines, to the dotted line position illustrated in FIG. 5 so the head rails turn forward of the cows' shoulders to enable the cows to walk forward off of car 22 onto platform 16. Head rail 52 is turned through 360° back to its original position. If a cow is still on car 22 after shaft 50 and head rails 52 have been rotated approximately 270° the head rail engages the top of the back of the cow approximately above the rear legs of the cow to prod the animal forward. To this end, shaft 50 includes a hollow extension 55 with a square cross section extending beyond the frame 48 closest to wall 53 (FIG. 1). Extension 55 fits over and mates with the hollow shaft of a gear box (not shown) driven by motor 51. Extension 55 has a square hollow cross section which is nested with the square cross section extension 55 of shaft 50 when car 22 initially comes to rest at station 36. Motor 51 then turns its shaft to, drive shaft 50. After shaft 50 has been turned 360° so head rails 52 are back to the normal position thereof, motor 51 stops turning and car 22 is moved slightly toward station 36 so extension 55 is moved away from the gear box hollow shaft.

Extending between frames 48 is stainless steel sheet metal back splash 5 positioned behind the cow in each stall 46 to receive excrement, i.e., urine and defecation, ejected from discharge organs of the cow. Back splash 56 is slidably mounted by rings 79 on eight fixedly mounted L shaped frames 54, six of which are provided at different stalls 46 between frames 48 and one at each end stall. The tops of frames 54 are tied to each other by being welded to cross beam 57. When car 22 is at station 24 Lower fingers 59 on gate 61 engage horizontally extending portion 56.1 of the bottom of back splash 56 to raise the back splash above the heads and backs of the cows to the dotted line position in FIG. 4, to enable the cows to enter the car. As the cows move onto platform 42 with car 22 at loading station 24 the forward motion of the cows is restrained by head rails 52. After the cows have walked head first onto car 22, while the car is stationary at station 24, gate 61 and fingers 59 are lowered enabling the back splash to descend to the full line position illustrated in FIG. 4.

Head rails 52 urge the animals backwardly while on platform 42 so the discharge organs thereof are above back splash 56 and the operator in pit 20 can easily place milking cups on front and rear teats of the cow, without having to lean forward; this enhances operator comfort. Back splash 56 and upwardly extending flange 56.3 at the back end of platform 42 prevent the animal from walking off the back end of platform 42.

Extending downwardly from platform 42 are wheel supporting trucks 82, (FIG. 6) in which are journaled bearing assemblies 62 and axles 84 for flanged wheels 64 that ride on rails 25, 25.1, 34 and 34.1. Rail segments 25.1 and 34.1 are carried by first and second transfer trucks 268 between path segments 21 and 23 at loading/discharging and milking ends of the path segments. When transfer trucks 268 are at stations 24, 32, 36 and 38 rail segments 25.1 and 34.1 are aligned with and spaced slightly from the remainder rails 25 and 34.

Car 22 includes elongated rack 66 for engaging a drive mechanism of stationary motor assembly 40, mounted on the floor of pit 70, and including AC braked motors 98 which hold the cars in situ at the stations when the motors are not activated. Rack 66 is mounted on the underside of plate 166 and runs between opposite sides of car 22.

Rail segment 25.1, at the pen end 14 of path sections 21 and 23, is fixedly mounted on stanchions 67 of transverse truck 268 including flanged wheels 71 which ride on rails 72 that extend transversely of path 10 between loading station 24 and discharging station 38, from pen 14 to platform 16. Rails 72 are mounted on the floor of pit 78, which is somewhat below the floor of pit 70 where motor drive assembly 40 is located. Truck 268 includes an undercarriage containing plural beams 74 and 75 that respectively extend longitudinally and transversely of car 22. Wheels 71 are carried by shafts having longitudinal axes extending parallel to the longitudinal axis of car 22. The shafts of wheels 71 are driven by AC braked electric motors 76, supported by the undercarriage including beams 74 and 75. Electric wires (not shown) connected to motors 76 supply the motors with appropriate drive current. After the cows have been discharged from car 22 at station 38, current is applied to AC motors 76 to drive wheels 71, causing truck 268 with car 22 thereon to traverse rails 72 so the car moves from station 36 to station 24. In a similar manner after the cows in car 22 have been milked and disinfectant has been applied to the teats thereof at station 32, the car and truck at station 32 are moved from the milking station to transfer station 36. The transfer mechanism at the loading and unloading ends of paths 10 and 12 is basically the same as the transfer mechanism 268 at milking station 32.

The milking pit operator stands on platform 86 in pit 20, between milking stations 32 at the ends of the forward path segments 21 of paths 10 and 12. Platform 86 is vertically adjusted by a drive mechanism (not shown) to enable the operator to comfortably work behind the cows on platforms 42.

Panel 88 is fixedly mounted at milking operator pit 20 and extends the length of car 22, to prevent the operator from accidentally having his legs contact transfer truck 268 or the wheels 60 and bearing assemblies 62 of cars 22. Milk line 90 extends from the milking cups 93 at station 32 through platform 42 along safety panel 88 into subterranean room 91 where various mechanisms, such as wash lines, milk lines, electric lines, etc. are located.

Figure 4:
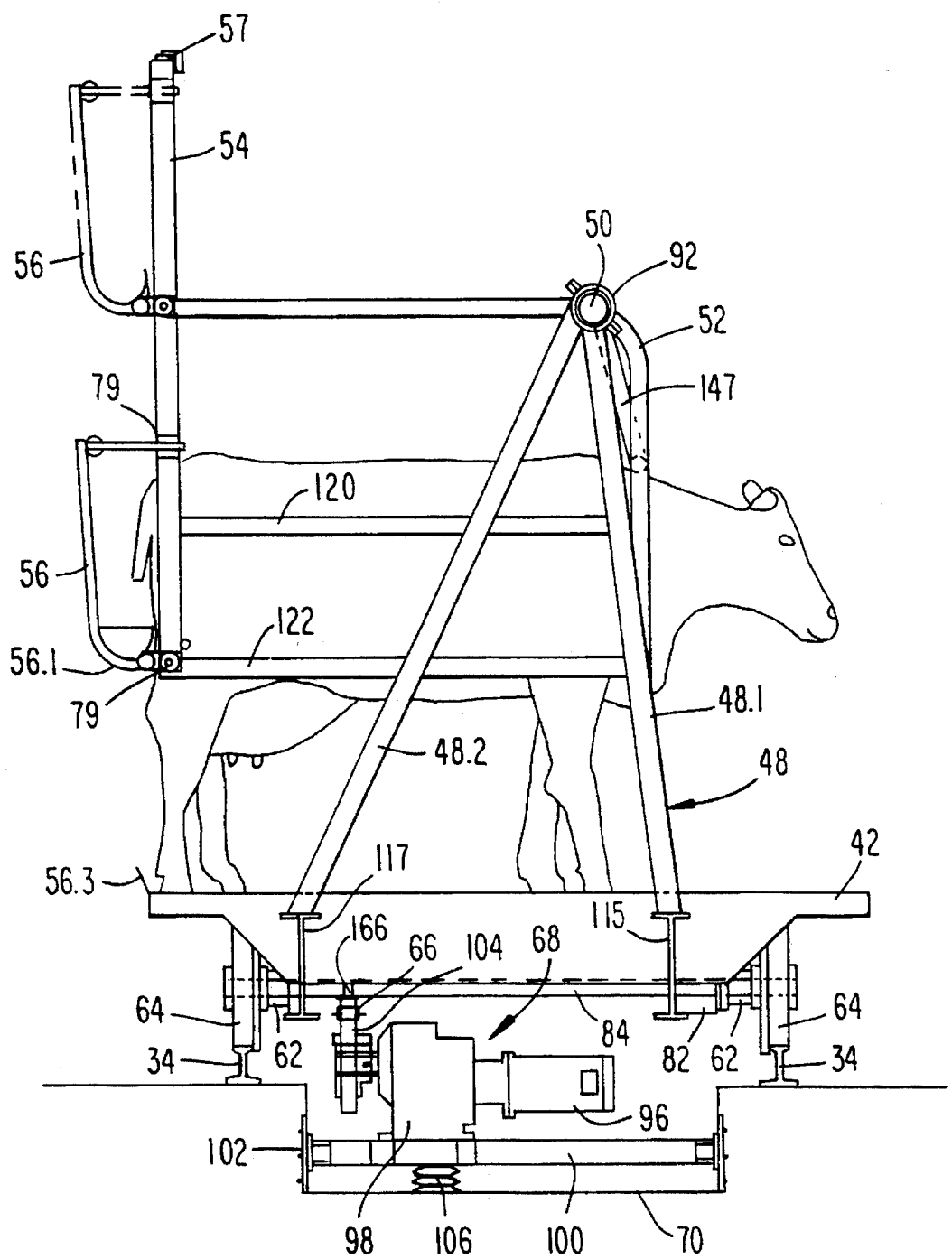
FIG. 4 is a side view taken through the lines 4—4, FIG. 2, at the end of the car illustrated in FIG. 2.

Reference is now made to FIG. 4 of the drawing, a side view of the end of car 22, wherein support frame 48 is more particularly illustrated as including beams 48.1 and 48.2, forming a triangular support structure providing lateral and transverse support to shaft 50. Shaft 50 is journaled in rings 92 at opposite ends and intermediate locations of car 22. The rings at the ends of car 22 are carried by the top ends of beams 48.1 and 48.2. The lower ends of beams 48.1 and 48.2 are welded to the top flanges of beams 115 and 117 that run the length of car 22.

Figure 9:
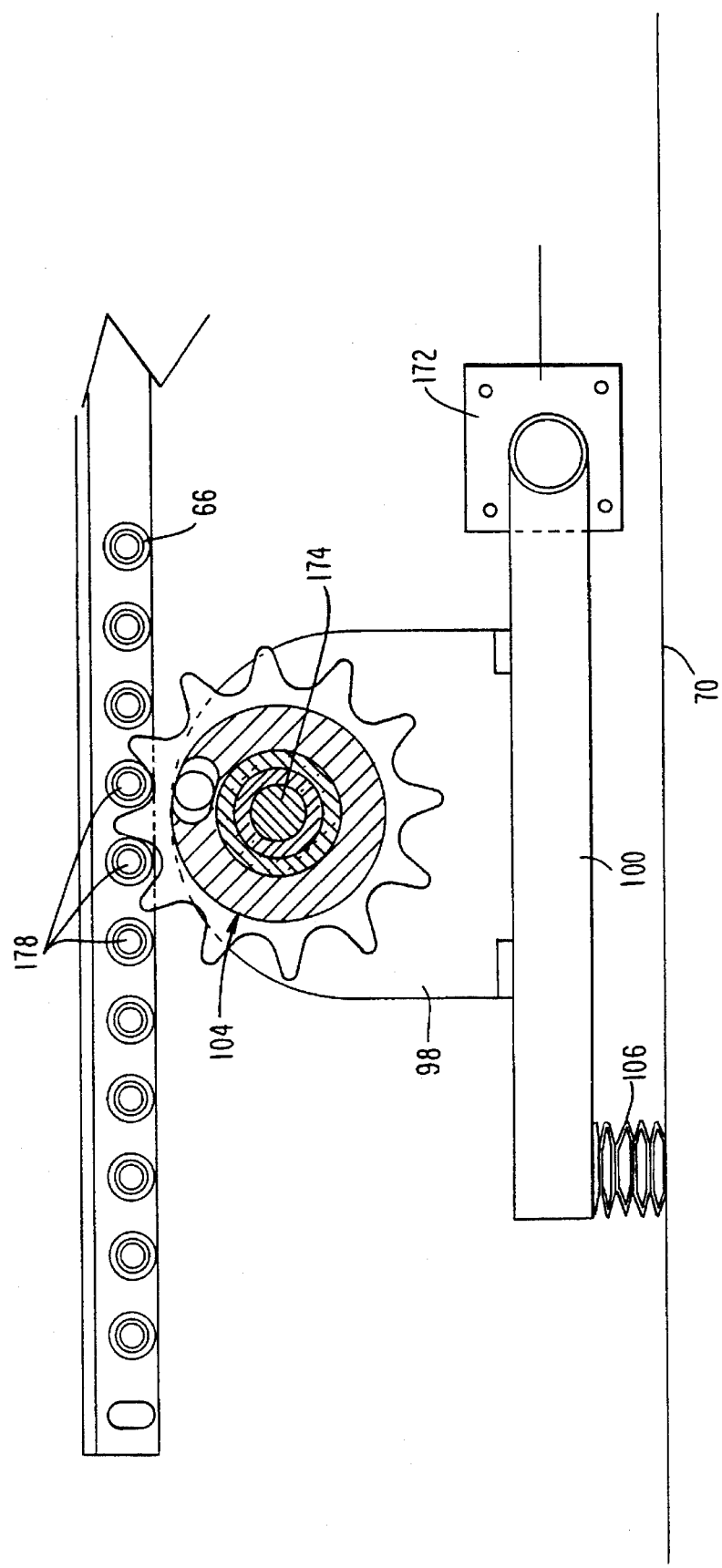
FIG. 9 is a side view of a rack and pinion arrangement included in the apparatus of FIG. 8 for driving the cars.

Drive mechanism 68 for rack 66, that extends between trucks 82 below axle 84, includes AC braked motor 96, mounted on gear box 98, in turn fixedly mounted on platform 100 that extends between and is secured to vertically extending walls 102 of pit or trench 70. Gear box 98 includes output shaft 174 for driving sprocket 104 (FIG. 9), having teeth for engaging rollers 178 of rack 66, fixedly mounted on the bottom of the car platform. One side of platform 100 is supported by compression spring 106, having bottom and top surfaces respectively connected to the floor of trench 70 and the bottom of the platform. Platform 100 is thereby upwardly urged so variations in the position of car platform 42 above the floor of pit 70, due to deflection of the car platform by the weight of the load thereon, are compensated. Positive driving contact is thereby maintained between sprocket 104 and the rollers of rack 66 regardless of the load on and deflection of platform 42.

Figure 2:
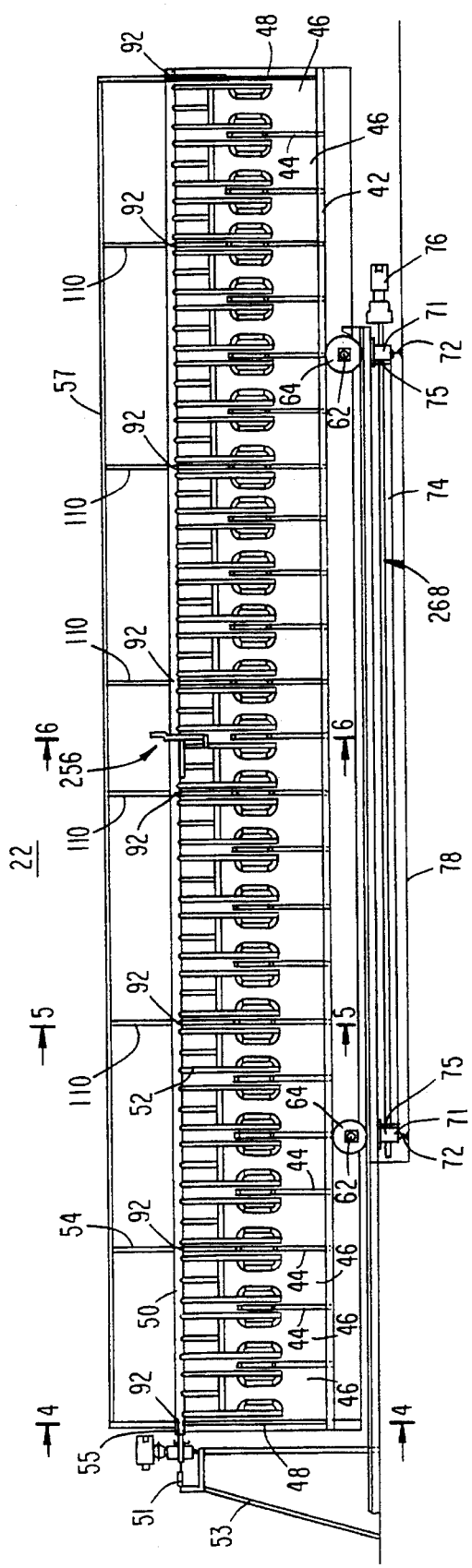
FIG. 2 is a front view of a car used in the system of FIG. 1, in place on rails at a discharging station for cows on the car.
Figure 5:
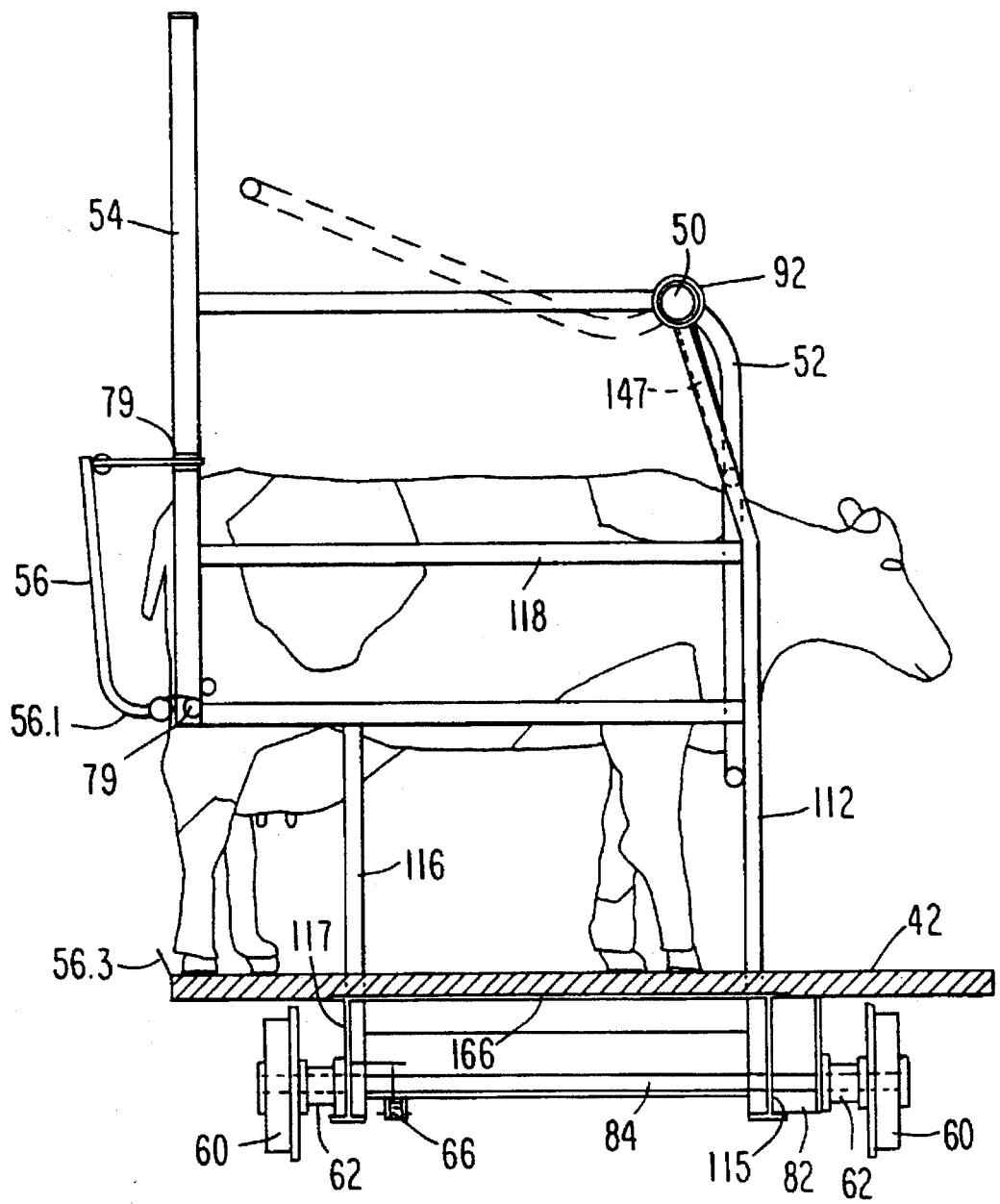
FIG. 5 is a side view, taken through the lines 5—5, FIG. 2, of another portion of a stall for a cow.

Reference is now made to FIG. 5 of the drawing, a cross sectional view taken through the lines 5—5, FIG. 2. The cross sectional view of FIG. 5, which is repeated four times along the length of car 22 at each of positions 110, includes pipe 112 which holds outer support ring 92 for hollow shaft 50. The top of pipe 112 is welded to the bottom of ring 92. From ring 92, pipe 112 extends downwardly and somewhat forward, toward the head of the cow. From a bend behind and below the cow's head, support pipe 112 extends vertically through an opening in platform 42, thence to the upper flange of beam 113 to which the pipe is welded. Support pipe 112 provides transverse support for housing 92 and shaft 50, but provides little lateral support for them; such lateral support is provided by the larger, rectangular cross section beams 48.1 and 48.2 forming support frame 48.

A front end of a horizontally extending portion of frame 54 for back splash 56 is fixedly secured to pipe 112 slightly above the bend in the pipe. A rear portion of the horizontally extending portion of frame 54 in the vicinity of the rear hind quarters of the cow is welded to the top of standard 116, which extends through a hole in platform 42. The bottom of standard 116 is connected to and supported by the upper flange of beam 117. Beams 115 and 117 are welded to the edges of plate 116 which abuts the underside of platform 42. Opposite ends of horizontally extending pipe 118 are connected to the vertically extending portion of frame 54 and the diagonally extending portion of pipe 112 to provide further rigidity for frame 54 and pipe 112, as well as ring 92 for shaft 50.

Figure 3:
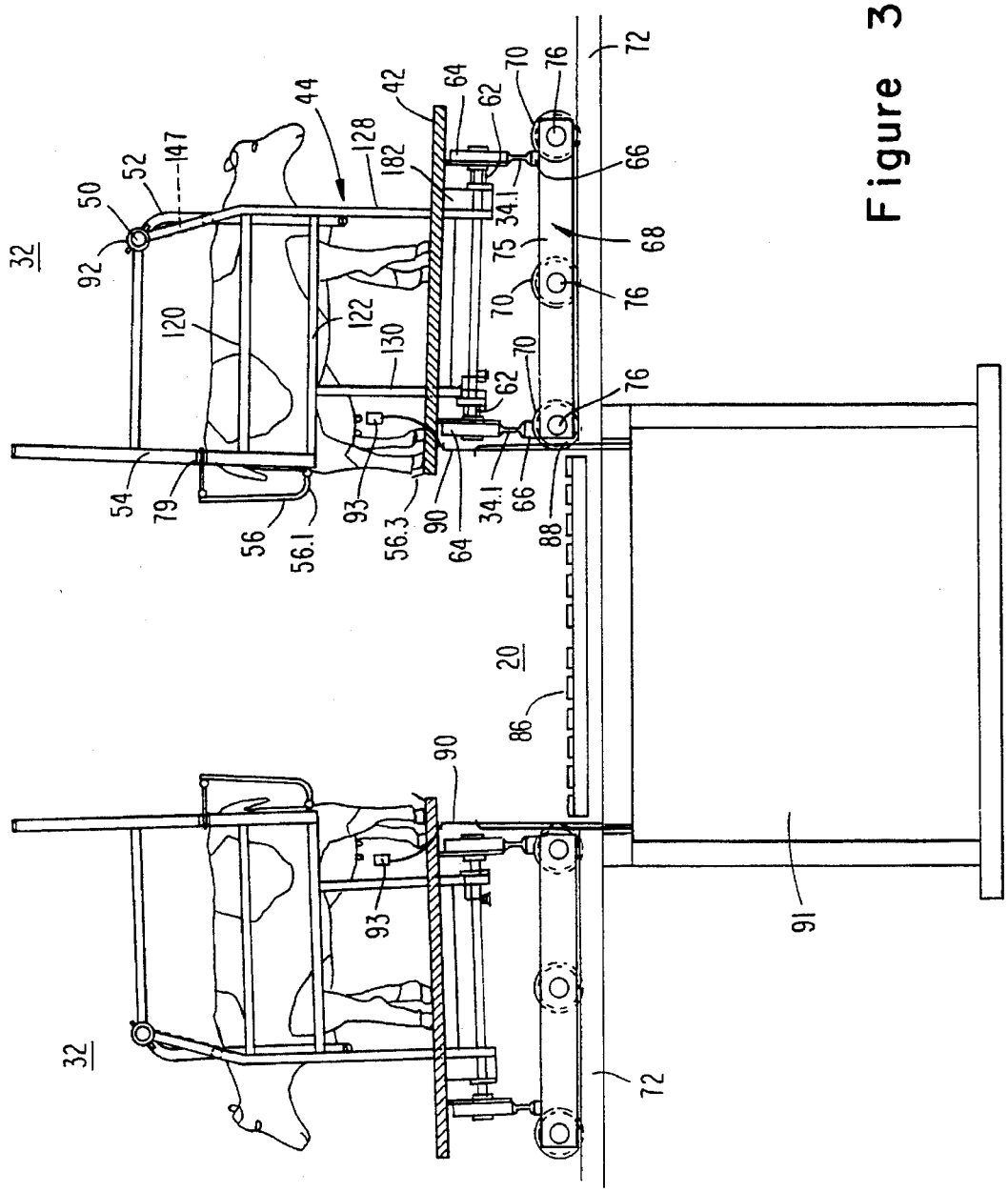
FIG. 3 is a side view of the apparatus illustrated in FIG. 1, taken through the lines 3—3 while two cars are at two parallel milking stations.
Figure 6:
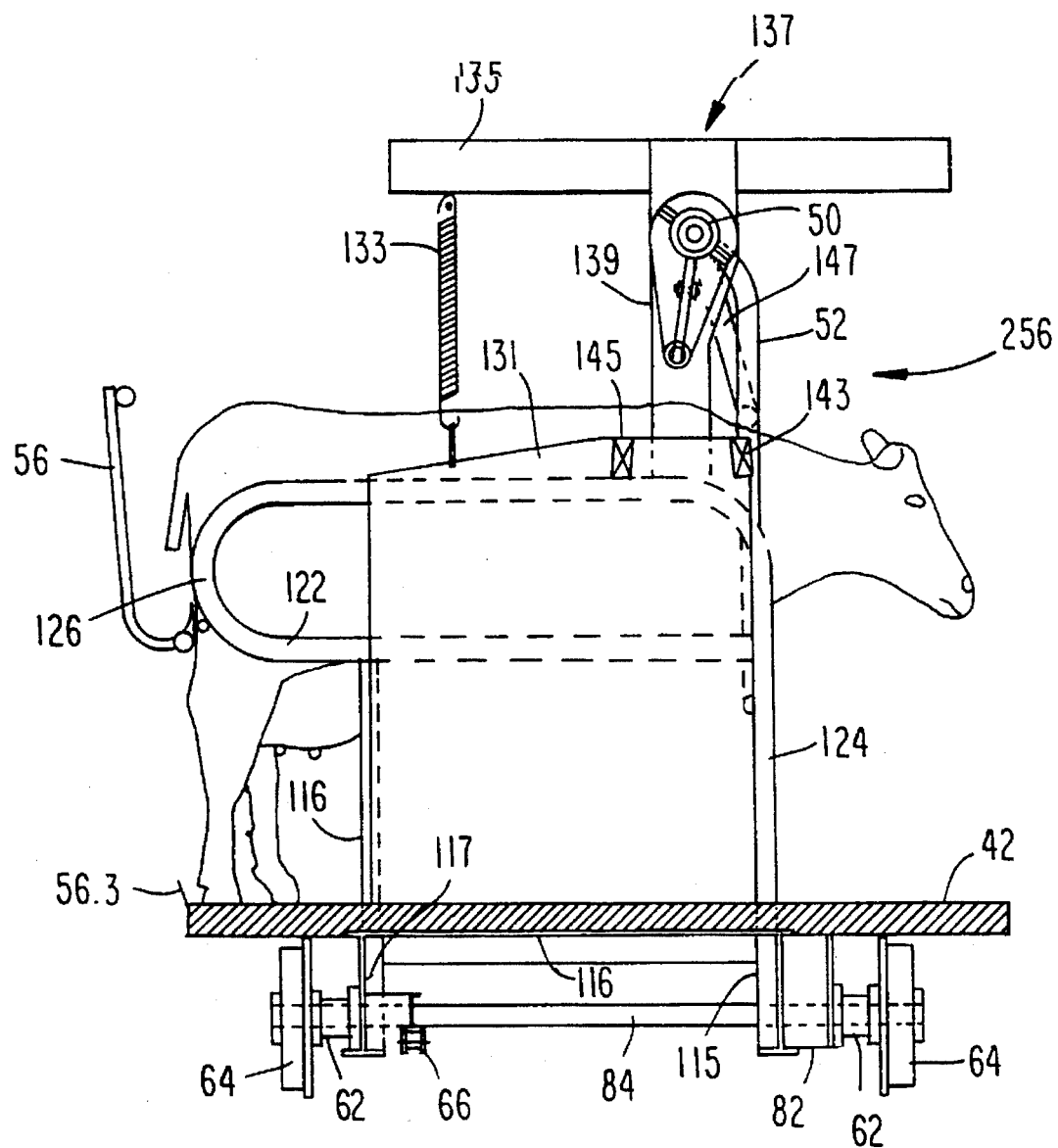
FIG. 6 is another side view, taken through the lines 6—6, FIG. 2, of apparatus for assuring that the cow remains in place in the stall.

As illustrated in FIGS. 3 and 6, each divider loop 44 includes upper, generally horizontally extending pipe rail 120, that is about the same height above platform 42 as the head of the cow, and lower horizontally extending pipe rail 122 that is about the same height above the platform as the upper ends of the legs of the cow. Rails 120 and 122 are connected together by curved generally vertically extending pipes 124 and 126 of the divider loop. Divider loop 44 includes forward and rear leg pipes 128 and 130, respectively extending through openings in platform 44, and welded to the upper flanges of beams 115 and 117. Divider loop 44 is positioned outside of head rail 52 to limit transverse movement of the cow in stall 46.

Welded to the outside of pipes 120, 122, 124, 126, 128 and 130 of each loop 44 is steel plate 131 that extends between the vicinity of the front and rear quarters of the cow and a position somewhat below the top of the back of the cow to the top of platform 42. Hence, a steel plate 131 is fixedly secured to both loop dividers 44 of each of stalls 46 to add structural strength which may be needed if many cows on car 22 lurch forward simultaneously. Such lurching is restrained and the cows are held in place by head rail 52 because the upper rear portion of fixedly secured plate 131 is connected by vertically extending tension spring 133 to the end of the long rearwardly extending arm of crossbeam 135 that forms part of T-shaped member 137 including downwardly extending leg 139 that is fixed to and turned by hollow shaft 50 on which the head rail is mounted.

Figure 7:
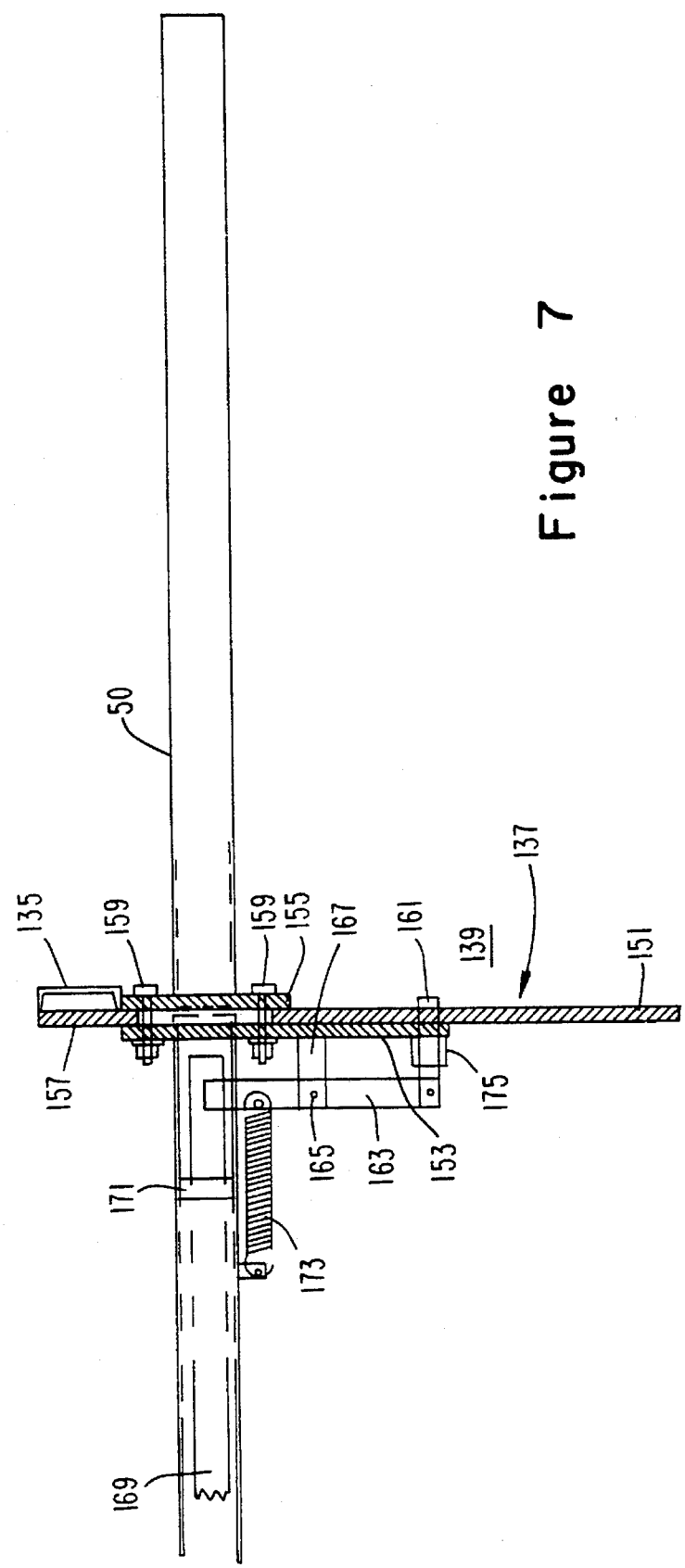
FIG. 7 is a detailed front view of a portion of the apparatus illustrated in FIG. 6.
Figure 8:
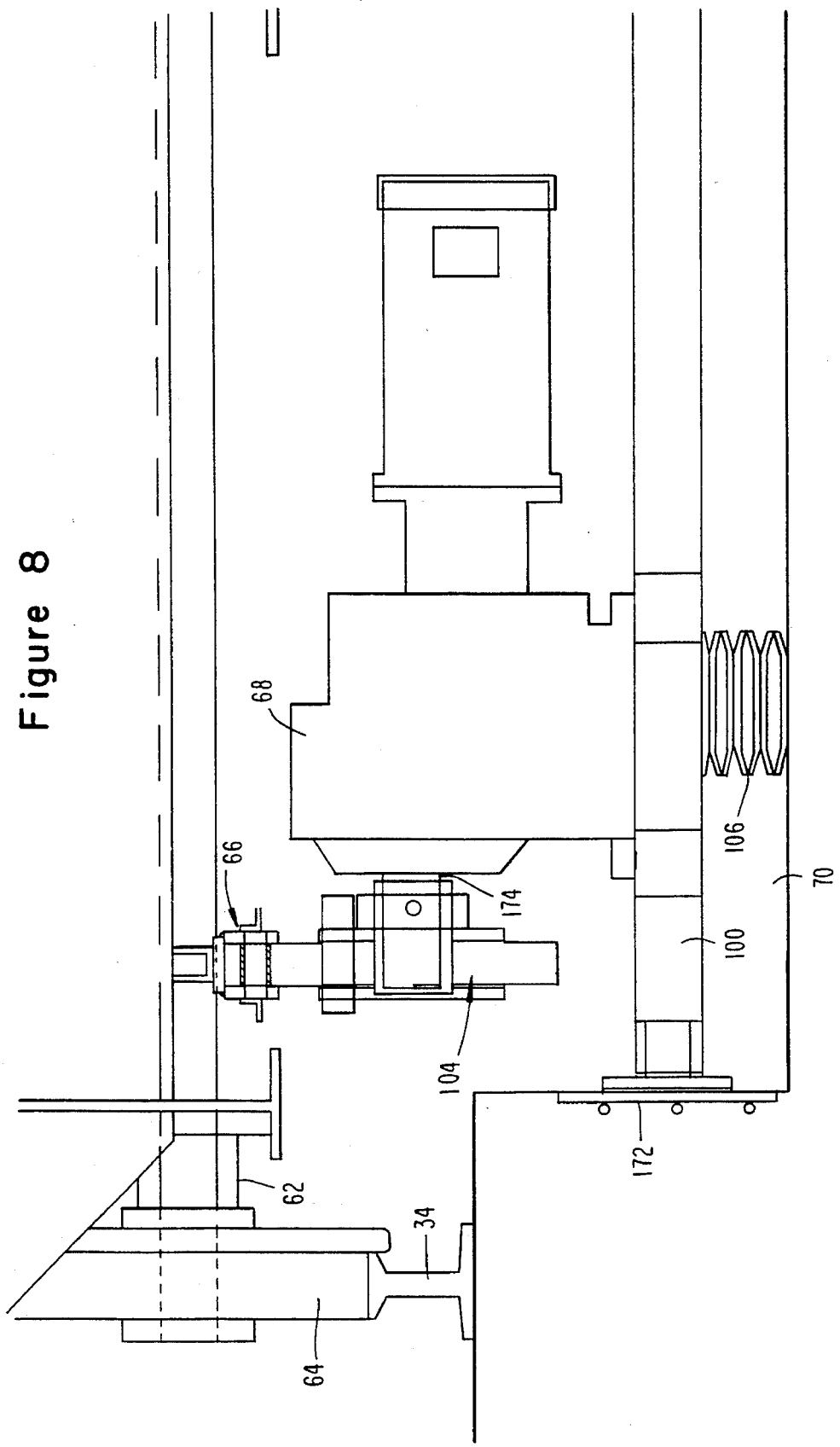
FIG. 8 is a detailed front view of the drive mechanism for the car illustrated in FIG. 2.

T-shaped member 137 is part of mechanism 256 for assuring that (1) the downwardly extending portion of head rail 52 bears against the shoulders of the cow and (2) the discharge organs of the cow are above back splash 56 as illustrated in FIGS. 6 and 7. A single mechanism 256 is provided on each of cars 22, being located in the center of the cars halfway between opposite end frames 48 thereof. Mechanism 256 also assures that the udders of the cows are properly positioned at washing station 28, drying station 30 and milking station 32.

Returning to the description of T-shaped member 137, beam 135 is welded to leg 139, having a lower indexing plate portion 141 (FIGS. 6 and 7) with a turning arc limited by stops 143 and 145 to about ±15°. Stops 143 and 145 are fixedly mounted to the top of plate 131 so stop 143 is generally somewhat in front of both front legs of the cow and stop 145 is approximately aligned with the front legs of a typical cow. The position of spring 133 on crossbar 135, the added weight of the portion of the crossbar to which spring 133 is attached and the location of the pivot point of leg 139 about shaft 50 are such that head rail 52, directly fixedly connected to shaft 50 and fixedly connected to the shaft by strut 147, bears against the front shoulder of different sized cows to maintain the cows in car 22 in place at all times except while the car is at discharging station 38.

Shortly after car 22 arrives at station 38, head rail 52 is released so it can be turned forward by shaft 50. To release head rail 52, leg 139 of T-shaped bar 137 is segmented so it includes flat indexing plate 151, vertically extending finger plates 153 and 155 and shoulder plate 157. Plate 157, welded to crossbar 135, includes a downwardly extending stub having parallel faces welded to facing parallel faces of plates 153 and 155 that are also secured to each other by nut and bolt sets 159 on opposite sides of shaft 50 to which the finger plates are welded. The end of plate 153 is selectively connected to a central portion of indexing plate 151 by lock pin 161 that extends transversely of the plates through normally aligned holes thereof and of bearing 175 that is welded to plate 153. During normal operation while pin 161 holds plates 151 and 153 together, crossbar 135 and the constituent parts of leg 139 turn as shaft 50 turns.

Shortly after car 22 arrives at discharging station 38, pin 161 is pulled from the aligned holes in plates 151 and 153, permitting turning of shaft 50 and head rail 52 independently of indexing bar 151. To this end, the end of lock pin 161 remote from plates 151 and 153 is fixedly secured to the end of vertically extending rod 163 having a center portion that pivots about stud 165 on horizontally extending finger 167, in turn welded to plate 153. Rod 163, extending through an opening in the bottom of shaft 50, normally fits in a notch close to the end of trip rod 169 where leg 139 is located. Trip rod 169 extends longitudinally through the center of pivot shaft 50 and is supported therein by appropriate bearings, e.g. bearing 171. The end of trip rod 169 remote from T bar 137 extends beyond shaft 50 so it is engaged by a vertical end wall of the hollow shaft of the gear box driven by the shaft of motor 51 on wall 53 of discharging station 38. The portion of rod 163 immediately below the periphery of shaft 50 is connected to one end of tension spring 173, having a second end fixedly connected to the outside of shaft 50.

In response to trip rod 169 being driven toward leg 139 by the vertical end wall of the gear box shaft, rod 163 is rotated clockwise (as viewed in FIG. 7) about pivot stud 165 whereby pin 161 is pulled from the aligned openings of plates 153 and 155 to release the plates from each other. The motion of pin 161 is arrested in bearing 175 that is fixedly mounted on plate 153. When car 22 moves slightly away from wall 53, trip rod 169 is pulled back by spring 173 to its normal position so pin 161 is driven into the holes in plates 151 and 153, causing the plates to again be held in place relative to each other. While plates 151 and 153 are released from each other, the gear box shaft driven by motor 51 turns shaft 50 and head rails 52 through 360°, so the cows can walk forward or are prodded past raised gate 67 at station 38 as described supra. After shaft 50 has been turned through 360° so head rails 52 are back in position and the cows are off of car 22, the inner shaft of motor 51 is retracted causing leg 139 to be re-formed. If station 24 is empty the operator at pen 14 then closes a switch to supply current to drive motors 76 for wheels 71 of transfer truck 268 at station 36 so car 22 is then moved from station 38 toward station 24.

In operation, a sensor (not shown) activates a controller for motor 96 when a car 22 enters each of stations 26, 28, 30 and 32. Motor 96 at each of these stations remains activated until the car 22 is fully positioned at the particular station. A signal is then supplied by a sensor to the motor 96 at the particular station, to stop the motor which then is braked. Motor 96 at a particular station remains braked until the car at the next, following station has been moved out of that station, as detected by a suitable sensor. Then, motor 96 at the particular station is activated to translate the car from the particular station to the next following station.

Motor 96 at loading station 24 is activated in response to commands by the operator at the loading station. When the operator determines that all of the cows have been loaded into the car 22 at loading station 24 and waiting station 26 is empty, the operator activates a switch to cause motor 96 at station 24 to be supplied with current to drive the car at the loading station to waiting station 26. The motor at loading station 24 remains activated until the car which was moved from the loading station arrives and is fully at waiting station 26.

While there has been described and illustrated one specific embodiment of the invention, it will be clear that variations in the details of the embodiment specifically illustrated and described may be made without departing from the true spirit and scope of the invention as defined in the appended claims. For example, the principles of the invention can be used in a system wherein cars move in circular like paths from the milking station to the discharging station, thence to the loading station. There could be several cow discharging stations along such a path, in different pasture and/or barn areas. In such a situation, one or more cars could be pulled by a relatively small locomotive from the milking area to widely spaced discharging areas, thence to the loading area.

I claim:

1. A method of milking at least several domestic animals on a large scale basis comprising loading at least several of the animals on a car while the car is at an animal loading station, moving the car with the animals thereon to a milking station, milking the animals while the car is at the milking station, the time required for the car to traverse the distance from the loading station to the milking station exceeding the time while the car is at the milking station, moving the car with the animals thereon from the milking station to an animal discharging station, and discharging the animals from the car while the car is at the discharging station.

2. The method of claim 1 further including moving the car from the discharging station to the loading station and repeating the steps of claim 1.

3. The method of claim 2 wherein a plurality of cars as defined in claim 1 are provided and the steps of claims 1 and 2 are performed with animals on said cars in sequence so that the loading step is performed in connection with one of said cars while another of said steps is being performed in connection with another of said cars.

4. The method of claim 3 wherein two of said loading, discharging and milking stations are provided, the steps of claims 1, 2 and 3 being performed at said two loading, discharging and milking stations, the two loading stations being located adjacent each other at a first region, and loading the animals from the first region into cars at the two adjacent loading regions.

5. The method of claim 4 wherein the two milking stations are located adjacent each other at a second region, and applying milking apparatus to teats of the animals in a first car at one of the milking stations during a first interval and then applying milking apparatus to teats of the animals in a second car at the other of the milking stations during a second interval.

6. The method of claim 5 wherein the loading and discharging stations are at first ends of first and second paths along which the cars move; the milking stations being at second ends of the first and second paths; each of the paths including first and second elongated segments, the second ends of the first and second elongated segments extending substantially parallel to each other; moving the cars in each of the paths from the loading station to the milking station along the first segment of the path; after the milking step has been performed on the animals in a particular car, transferring that car to the second end of the second segment of the path; then moving the particular car from the second end of the second segment of the path to the first end of the path; after the animals have been discharged from the particular car at the first end of the second segment of the path, transferring the particular car from the first end of the second segment of the path to the first end of the first segment of the path where the animals are loaded onto the cars.

7. The method of claim 1 wherein the loading and discharging stations are at a first end of a path along which the cars move; the milking station being at a second end of the path, the path including first and second elongated segments, the second ends of the first and second elongated segments extending parallel to each other, moving the cars in from the loading station to the milking station along the first segment of the path; after the milking step has been performed on the animals in a particular car, transferring that car to the second end of the second segment of the path; then moving the particular car from the second end of the second segment of the path to the first end of the path; after the animals have been discharged from the particular car at the first end of the second segment of the path, transferring the particular car from the first end of the second segment of the path to the first end of the first segment of the path where the animals are loaded onto the cars.

8. The method of claim 1 further including applying a cleaning agent tip teats of the animals while the animals are on the car and the car is between the loading and milking stations.

9. The method of claim 8 further including causing the teats to dry between the time the cleaning agent is applied and the time the animals arrive at the milking station.

10. The method of claim 1 wherein the car is stationary at each of said loading, milking and discharging stations.

11. The method of claim 1 further comprising positioning the car so it is broadside of a path between the milking station and the loading and discharging stations while at said loading and discharging stations so there is (a) simultaneous equal access by the animals to at least several of the animals from a loading area into stalls of the car while the car is at the loading station, and (b) simultaneous equal access for the animals in the car from the stalls of the car into a discharge area while the car is at the discharging station.

12. The method of claim 11 wherein the stalls are arranged so the animals can enter them head first, an excrement-catching means being located at an end of each stall where the animal discharge organs are located and in a path of an animal entering the stalls, and moving the excrement-catching means from the path of the animals entering the stalls from the loading area.

13. The method of claim 12 wherein the excrement-catching means is movably being raised above heads and bodies of animals entering the stalls.

14. A system for simultaneously milking at least several domestic animals on a large scale basis comprising plural cars, each of said cars being arranged for simultaneously carrying at least several of the domestic animals, a loading station for the animals in a path along which the cars move, a milking station along the path, a discharging station for the animals along the path, the path including a space between the loading and milking stations greater than the length of each of the cars, the loading station and the cars being arranged so the animals can be simultaneously loaded into the cars while the cars are at the loading station, and means for intermittently moving the cars along the path so that the cars are stationary at the loading and milking stations.

15. The system of claim 14 wherein the means for moving is activated so the time between initial movement of a particular car from the loading station and the arrival of the particular car at the milking area is greater than the time required to milk the animals in one car.

16. The system of claim 14 further including means along the path between the loading and milking stations for applying a cleaning agent to teats of the animals in the cars.

17. The system of claim 16 further including a station along the path between the cleaning agent applying means and the milking station where teats of the animals in the cars dry.

18. The system of claim 17 wherein the means for moving causes the cars to be stationary at the cleaning agent applying means and at the drying station where the teats dry.

19. The system of claim 16 wherein the means for moving causes the cars to be stationary at the cleaning agent applying means.

20. The system of claim 14 wherein the path includes first and second elongated segments, the first and second elongated segments having portions extending parallel to each other remote from the loading and discharging stations, the first elongated segment including the loading and milking stations, the second elongated segment including the discharging station, the parallel portions and the means for moving being arranged so each car is transferred from the first elongated segment parallel portion to the second elongated parallel portion after the animals in a particular car are milked at the milking station.

21. The system of claim 20 wherein the first and second segments have further portions extending parallel to each other at the discharging and loading stations, the further parallel portions and the means for moving being arranged so each car is transferred from the first elongated segment to the second elongated further parallel portion after the animals in a particular car have been discharged at the discharging station from the car.

22. The system of claim 21 wherein each of the segments includes elongated rails and each of the cars includes wheels to be received by the rails of each of segments, and means for transferring the cars from the elongated rails of the first segment to the elongated rails of the second segment to provide the transfer after the animals have been milked and for transferring the cars from the elongated rails of the second segment to the elongated rails of the first segment to provide the transfer after the animals have been discharged.

23. The system of claim 22 wherein the means for transferring includes a transfer truck carrying the rails receiving the car wheels, a further set of rails extending at right angles to the elongated parallel rails of the first and second segments, the transfer truck including further wheels receive by the further rails.

24. The system of claim 20 wherein each of the segments includes elongated rails and each of the cars includes wheels to be received by the rails of each of segments, and means for transferring the cars from the elongated rails of the first segment to the elongated rails of the second segment to provide the transfer after the animals have been milked.

25. The system of claim 24 wherein the means for transferring includes a transfer truck carrying the rails receiving the car wheels, a further set of rails extending at right angles to the elongated parallel rails of the first and second segments, the transfer truck including further wheels received by the further rails.

26. The system of claim 14 wherein two paths as defined in claim 14 are included, the two paths being arranged so the milking stations thereof are adjacent each other enabling a single operator to operate milking apparatus at each of said milking stations.

27. The system of claim 26 further including a loading area for the animals, the loading stations of the two paths being positioned so the loading area is between the loading stations of the two paths and the loading stations are sufficiently close to each other to enable a single operator to load the animals from the loading area into the cars at the loading stations of the two paths.

28. The system of claim 14 wherein the cars are arranged so the animals can simultaneously enter them at the loading station in a direction at right angles to the direction of the path at the loading station.

29. The system of claim 14 wherein each of the cars is elongated in the direction of the path and includes a plurality of parallel stalls arranged so the animals have simultaneous equal access to them.

30. The system of claim 29 wherein each car includes means for catching excrement of the animal in each stall, and means for controlling the position of the animal in each stall so the excrement-catching means is positioned relative to excrement discharge organs of the animal to catch excrement released by said organs.

31. The system of claim 30 wherein the stalls are arranged so the animals can enter them head first and the excrement-catching means is located at an end of the stall where the animal discharge organs are located and in a path of an animal entering said stalls, and means for moving the excrement-catching means from the path of the animals entering the stalls.

32. The system of claim 31 wherein the means for moving raises the excrement-catching means above the heads and bodies of animals entering the stalls.

33. The system of claim 14 where each car includes means for catching excrement of the animals on the car, and means for controlling the position of the animals on the car so the excrement-catching means is positioned relative to excrement discharge organs of the animal to catch excrement released by said organs.

34. The system of claim 33 wherein each car is arranged so the excrement-catching means is in a path taken by the animal on the car, and means for moving the excrement-catching means out of the paths while the animal is traversing the path.

35. The system of claim 34 wherein the means for moving raises the excrement-catching means above the heads and bodies of the animals traversing the paths.

36. A car for transporting at least several animals comprising an elongated platform on which the animals stand, at least several stalls for the animals on the platform, the stalls being arranged so the animals can have simultaneous access to them from a loading area, at least two sets of wheels having axles at right angles to the elongation direction of the platform, means for catching excrement of the animal in each stall and means for controlling the position of the animal in each stall so the excrement-catching means is positioned relative to excrement discharge organs of the animal to catch excrement released by said organs, the stalls being arranged so the animals can enter them head first and the excrement-catching means is located at an end of the stall where the animal discharge organs are located and in a path of an animal entering said stalls, and means for moving the excrement-catching means from the path of the animals entering the stalls.

37. The car of claim 36 wherein the means for moving raises the excrement-catching means above the heads and bodies of animals entering the stalls.

* * * * *